United States Patent [19]
Mouton et al.

[11] 3,911,426
[45] Oct. 7, 1975

[54] MULTIPLEXED FIELD EFFECT LIQUID CRYSTAL DISPLAY ACCESSING CIRCUITRY AND SYSTEM

[75] Inventors: Alcee Gonzague Mouton, Phoenix; Alvin Pshaenich, Scottsdale, both of Ariz.

[73] Assignee: Motorola, Inc., Chicago, Ill.

[22] Filed: Nov. 4, 1974

[21] Appl. No.: 520,578

[52] U.S. Cl............................ 340/336; 350/160 LC
[51] Int. Cl.² ........................................... G08B 5/36
[58] Field of Search ...................................... 340/336

[56] References Cited
UNITED STATES PATENTS

| | | | |
|---|---|---|---|
| 3,653,745 | 4/1972 | Mao | 350/160 LC |
| 3,740,717 | 6/1973 | Huener et al. | 340/166 EL |
| 3,744,049 | 7/1973 | Luce | 340/336 |
| 3,760,406 | 9/1973 | Walton | 340/336 |
| 3,781,864 | 12/1973 | Fujita | 340/336 |
| 3,789,388 | 1/1974 | Medwin | 340/336 |
| 3,809,458 | 5/1974 | Heuner et al. | 350/160 LC |
| 3,820,108 | 6/1974 | Luce | 340/336 |
| 3,845,615 | 11/1974 | Cake | 340/336 X |
| 3,863,247 | 1/1975 | Hosokawa | 340/336 |

*Primary Examiner*—David L. Trafton
*Attorney, Agent, or Firm*—Vincent J. Rauner; Willis E. Higgins

[57] ABSTRACT

This accessing circuitry allows conventional multiplexing techniques to be used in a system with a liquid crystal display having a plurality of digits, each digit having a plurality of segments and a back plane. The circuitry includes a source of information to be supplied to the array. A plurality of enabling gates is provided, one for each segment and one for the back plane for each digit of the liquid crystal display. A decoder/driver is connected between the source of information and the enabling gates for the segments of the liquid crystal display. Means is provided for supplying drive signals and control pulses to the enabling gates, whereby signals equal but opposite in polarity are applied to selected ones of the segments and their back planes and signals of the same polarity and magnitude are supplied to unselected segments and their back planes. This circuitry allows multiplexing of liquid crystal displays without supplying any direct current (DC) signal component to the liquid crystal cells of the display, thus avoiding degradation of the cells.

9 Claims, 6 Drawing Figures

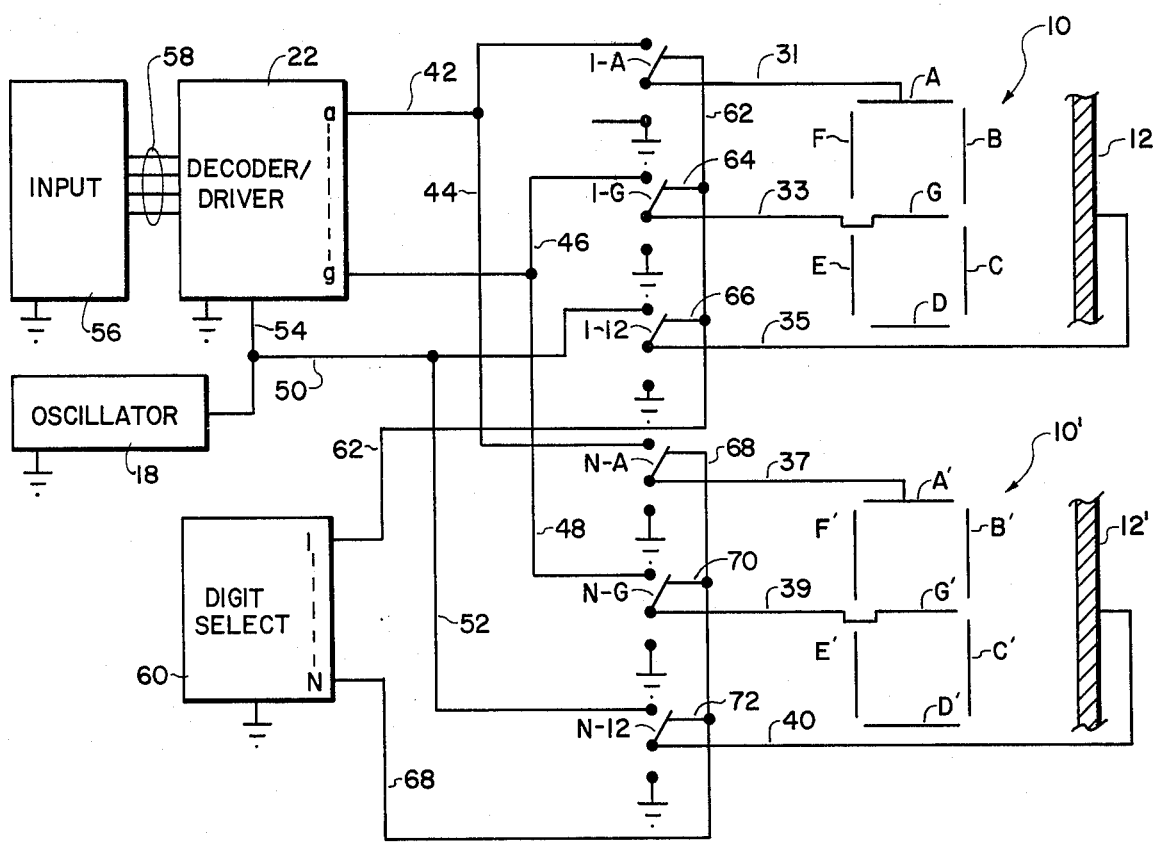
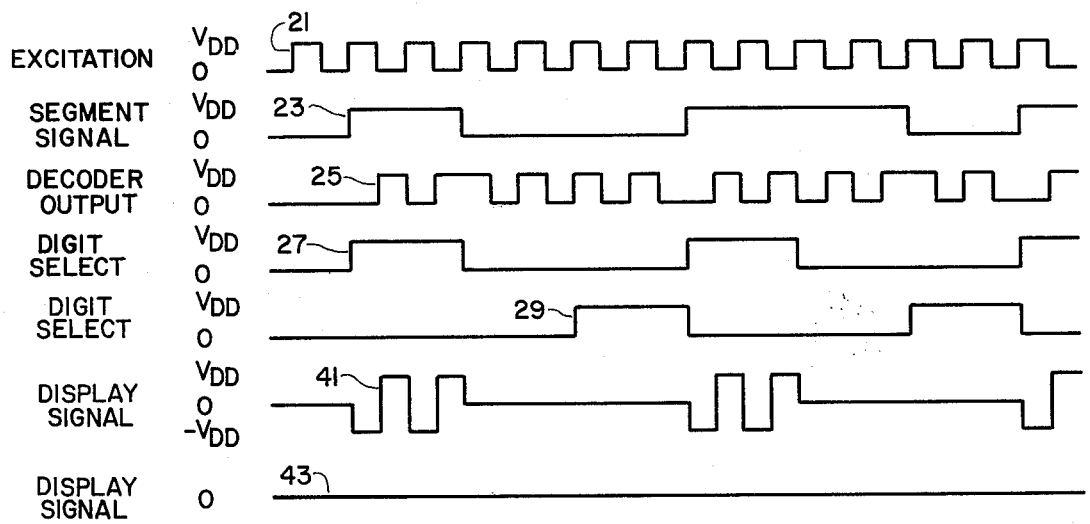
FIG. 2a
FIG. 2b

MULTIPLEXED FIELD EFFECT LIQUID CRYSTAL DISPLAY ACCESSING CIRCUITRY AND SYSTEM

FIELD OF THE INVENTION

Displays utilizing liquid crystals are well known in the art. The two major types of such displays are twisted nematic field effect liquid crystal displays and dynamic scattering liquid crystal displays. Both types generally have a field plane and a segmented display, with the liquid crystal material disposed between the back plane and segmented display.

Liquid crystal displays require an alternating current (AC) drive signal with no DC component. The presence of a DC component in the drive signal, which would be produced by a single ended drive signal applied to either the segments or back plane of a liquid crystal cell, will result in electrolysis and plating of the liquid crystal material on the walls of the liquid crystal cell, thereby decreasing its life. This drive signal constraint has hitherto prevented the use of conventional direct drive multiplexing techniques for providing drive signals to a plurality of liquid crystal cells forming a display from a shared source of drive pulses.

Prior attempts to multiplex liquid crystal displays have therefore relied on more complex frequency coincidence addressing or voltage discrimination techniques. While such techniques allow liquid crystal displays to be multiplexed, they are considerably more complicated than conventional multiplexing techniques utilized with other types of displays where DC components on the drive signal are not harmful. A need therefore exists for an approach that will enable liquid crystal displays to be multiplexed more simply.

SUMMARY OF THE INVENTION

Accordingly, it is an object of this invention to provide multiplexing circuitry which allows a simple address scanning approach to be used with a liquid crystal display without decreasing life of liquid crystal cells in the display.

It is another object of the invention to provide multiplexing circuitry suitable for driving a liquid crystal display without utilizing a frequency coincidence technique or different voltage levels for selective addressing.

It is a further object of the invention to provide a multiplexed liquid crystal display system in which alternating current pulses of the same phase and magnitude and having no direct current component are supplied to unselected segments and the back plane of the liquid crystal cells, and out of phase signals with no direct current component are supplied to selected segments and their back plane.

The attainment of these and related objects may be achieved through use of the novel multiplexing circuitry and system for liquid crystal displays herein disclosed. The novel system of this invention includes the accessing circuitry and a liquid crystal display with a plurality of digits. Each digit has a plurality of segments and a back plane, with the liquid crystal material being disposed between the segments and the back plane. The accessing circuitry includes a source of information to be selectively supplied to the display. A plurality of enabling gates are provided, one for each segment and one for the back plane for each digit of the liquid crystal display. A decoder/driver is connected between the source of information and the enabling gates for the segments of the liquid crystal display. Means is provided for supplying drive signals and control pulses to the enabling gates, whereby signals equal but opposite in polarity are applied to the selected segments and their back planes, and signals of the same polarity and magnitude are applied to unselected segments and their back planes. The provision of the enabling gates between the source of drive signals for the segments and back planes of the liquid crystals in the displays allows information to be supplied to the liquid crystal cells of the display by a conventional address scanning multiplexing technique, without impressing a net DC signal component between the segments and back planes of the liquid crystal cells. This means that use of a multiplexing technique does not result in a decrease in liquid crystal display life.

The attainment of the foregoing and related objects, advantages and features of the invention should be readily apparent after review of the following more detailed description of the invention, read in conjunction with the drawings, in which:

BRIEF DESCRIPTION OF THE DRAWINGS

FIG. 1b is an idealized representation of wave forms useful for understanding the operation of the direct drive in FIG. 1a;

FIG. 2a is a simplified diagrammatic representation of liquid crystal accessing circuitry and a system in accordance with the invention;

FIG. 2b is an idealized representation of wave forms useful for understanding the operation of the circuit and system shown in FIG. 2a;

DETAILED DESCRIPTION OF THE INVENTION

Figure 1A:
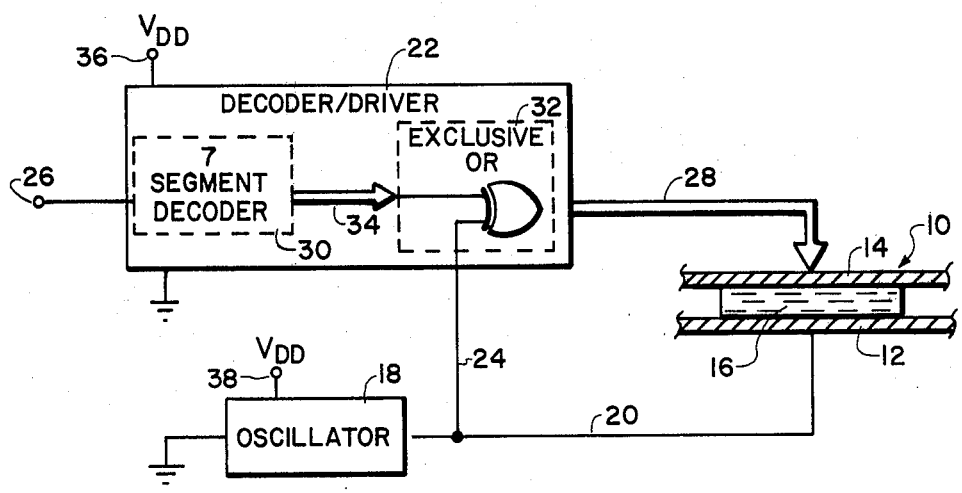
FIG. 1a is a diagrammatic representation of a prior art direct drive for a liquid crystal display.

Turning now to the drawings, more particularly to FIG. 1a, there is shown a simplified representation of a prior art direct drive liquid crystal display. For simplicity, only a single digit of the display is shown, but each additional digit replicates the elements shown. A liquid crystal cell 10 of the display has a back plane 12 and a segment plane 14. Liquid crystal material 16 is disposed between the two planes. The segment plane 14 is divided into the conventional figure eight shaped arrangement of seven segments. In this description, it will be assumed that the liquid crystal cell 10 is of the twisted nematic variety, although a dynamic scattering liquid crystal cell would have the same generalized elements shown.

Oscillator 18 is connected to back plane 12 by line 20 and to exclusive OR block 32 of decoder/driver 22. Terminal 26 of decoder/driver 22 is connected to a source of signals to be supplied to the segments of segment plane 14. Bus 28 connects decoder/driver 22 and the segments of segment plane 14. Decoder/driver 22 contains a seven segment decoder 30 having each output connected to one of seven exclusive OR gates contained in exclusive OR block 32 by bus 34. For a conventional seven segment digit liquid crystal cell, bus 28 and bus 34 contain seven lines each. Operating voltages for decoder/driver 22 and oscillator 18 are supplied at terminals 36 and 38. As noted above, the elements shown must be duplicated for each digit of a direct drive liquid crystal display. Thus, a six or nine digit display requires six or nine seven-segment decoders 30, for example.

Figure 1B:
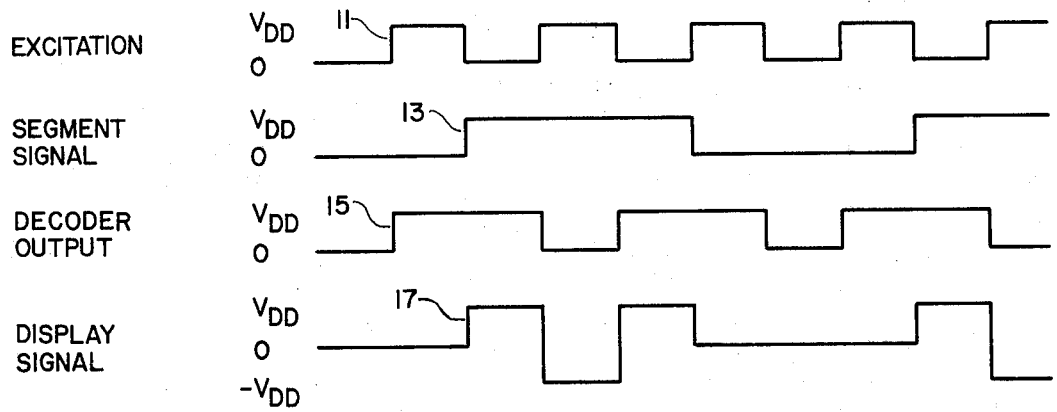

The waveforms of FIG. 1b serve to show operation of the prior art liquid crystal system of FIG. 1a. The excitation signal 11 output of oscillator 18 is applied to one input of the seven exclusive-OR gates 32 of decoder/driver 22 and also the back plane 12. The segment signal 13 output of the seven segment decoder 30 is applied to the other exclusive-OR inputs. The resultant decoder output signal 15 from decoder/driver 22 feeds the segment plane 14 of liquid crystal cell 10.

The display signal 17, as measured across the liquid crystal cell 10 between plates 12 and 14, will result. When excitation signal 11 and decoder output 15 are of the same polarity and magnitude (in phase), no voltage (zero) will be across the liquid crystal cell 10 and the cell will be de-energized. When excitation signal 11 and decoder output 15 are equal but opposite in polarity (out of phase), the selected segment will be energized by the display signal 17. The resultant display signal 17 will be an alternating current waveform of magnitude $+V_{DD}$ to $-V_{DD}$ with no direct current component. $V_{DD}$ is the power supply voltage for the decoder/driver and oscillator, as supplied to terminals 36 and 38 in FIG. 1.

For other types of displays (e.g., light emitting diodes, incandescent displays) multiplexing can be accomplished simply by scanning the digit drives. All common digit segments can be tied to their respective decoder outputs. However, for liquid crystal displays this approach cannot be used since the display will always see a singal across it even when the back plane is not strobed. The resulting segment signal is single ended and thus has a DC component which is deleterious for liquid crystal cells.

Turning now to FIG. 2a of the drawings, a simplified version of circuitry and a system in accordance with the invention are shown. Shown in diagrammatic form are two liquid crystal cells 10 and 10' of the same type shown in FIG. 1a. Each liquid crystal cell 10 and 10' has a back plane 12 and 12' and seven segments A through G and A'–G', respectively. Switch 1-A is connected to segment A by line 31. Switch 1-G is connected to segment G by line 33. Additional switches (not shown) are connected to the remaining segments B–F. For simplicity, the additional switches have been omitted. Switch 1-12 is connected to back plane 12 by line 35. In a similar manner, switches N-A, N-G and N-12 are connected to segments A' and G' and back plane 12' of liquid crystal cell 10' by lines 37, 39 and 40, respectively. Switch 1-A is connected to decoder/driver 22 by line 41. Similarly, switches 1-G and N-G are connected to decoder/driver 22 by lines 46 and 48, respectively. Decoder/driver 22 contains the same internal elements as in FIG. 1a, but only one is required for the system, as contrasted to one per digit in the prior art direct drive system of FIG. 1a. Switches 1-12 and N-12 are connected to oscillator 18 by line 50 and 52, respectively. Line 54 connects oscillator 18 to decoder/driver 22. Information input 56 is connected to decoder/driver 22 by lines 58.

Switches 1-A, 1-G and 1-12 are commoned to digit select means 60 by lines 62, 64 and 66. Switches N-A, N-G and N-12 are commoned to digit select means 60 by lines 68, 70 and 72, respectively.

The waveforms shown in FIG. 2b will be of assistance in understanding the operation of the system shown in FIG. 2a.

These waveforms are similar to those of FIG. 1b. The excitation signal 21 and segment signal 23 are fed to the exclusive -OR gate in the decoder/driver 22 to produce the decoder output signal 25. The digit select 60 (1) − (N) output signals 27–29, respectively, are sequential in time. There are as many digit select outputs as there are liquid crystal cells. All seven segment contacts and the back plane contacts of the switches are controlled by their respective digit select output. The digit select signal 27 first selects the first set of switches 1-A through 1-12, a similar digit select signal (not shown) selects the second set of switches (not shown), etc., through digit select signal 29 for selection of the Nth set of switches N-A through N-12.

The liquid crystal cells 10 and 10' are controlled only when their respective switches are selected. When the switches are not selected, the cells will see ground and no voltage will be applied to either the segment planes or back planes of the cells. This is illustrated by display signal 41 alternating current waveform for cell 10 being applied to its cell only when both the digit select waveform 27 and segment signal 23 are up. The display signal waveform 43 for cell 10' is shown as a constant zero volts (with time) since the segment signal 23 is zero during the time that digit select waveform 29 is up.

Multiplexing is accomplished by sequentially interrupting the segments and back plane lines. This technique thus prevents a singled ended signal of magnitude $V_{DD}$ from being applied to the segments, which would produce a net DC signal component across the liquid crystal display and would produce an erroneous activation of the display, as would be the case for a conventional (non-gated) multiplexed system.

Figure 3:
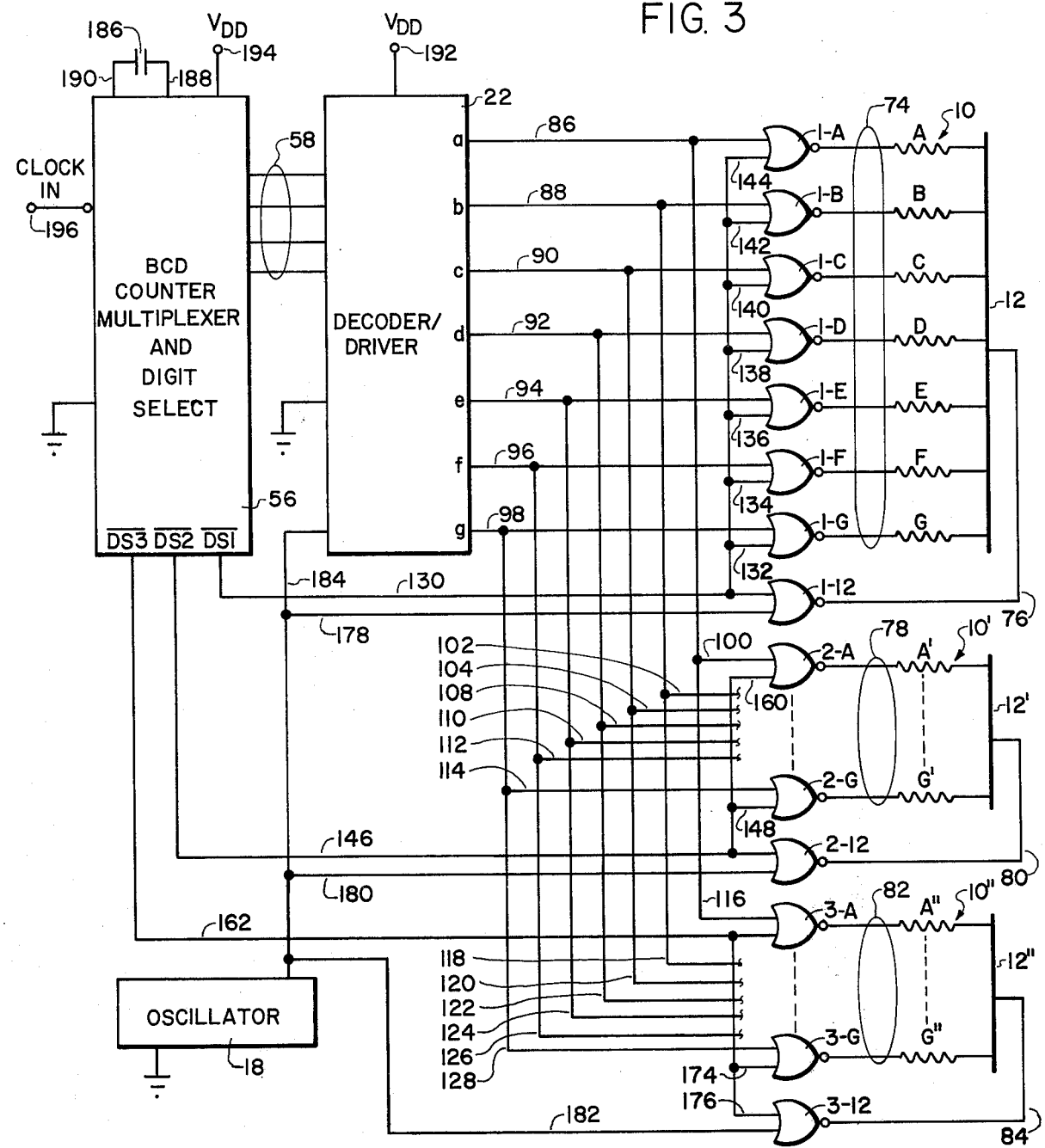
FIG. 3 is a diagrammatic representation of a more detailed embodiment of the circuit and system in accordance with the invention.

FIG. 3 shows a more detailed embodiment of a liquid crystal display system in accordance with the invention. The system is shown as a three digit liquid crystal display, although greater numbers of digits are usually employed, for example six or nine for calculator appliances. The three liquid crystal cells of the system are indicated generally by the reference numbers 10, 10' and 10''. Each has a back plane 12, 12' and 12'', respectively. The segments of each liquid crystal cell are represented by resistors A–G, A'–G' and A''–G''. NOR gates 1-A through 1-G are connected to segments A-G by lines 74. NOR gate 1-12 is connected to back plane 12 by line 76. NOR gates 2-A through 2-G are connected to segments A' through G' by lines 78. NOR gate 2-12 is connected to back plane 12' by line 80. NOR gates 3-A through 3-G are connected to segments A'' through G'' by lines 82. NOR gate 3-12 is connected to back plane 12'' by line 84.

Decoder/driver 22 is connected to the NOR gates 1-A through 1-G by lines 86, 88, 90, 92, 94, 96 and 98, which form one input to the NOR gates 1-A through 1-G. Similarly, lines 100, 102, 104, 108, 110, 112 and 114 connect decoder/driver 22 to NOR gates 2-A through 2-G forming one input of these NOR gates. Lines 116, 118, 120, 122, 124, 126 and 128 connect decoder/driver 22 to NOR gates 3-A through 3-G in the same manner.

Digit select line 130 and lines 132, 134, 136, 138, 140, 142 and 144 connect digit select output $\overline{DS1}$ of counter, multiplexer and digit select 56 to NOR gates 1-A through 1-G and 1-12 and form the other inputs for NOR gates 1-A through 1-G. Digit select line 146 and associated lines 148–160 connect digit select output $\overline{DS2}$ of counter, multiplexer and digit select 56 to NOR gates 2-A through 2-G and 2-12 in the same manner. Digit select line 162 through associated lines 176 perform the same function for NOR gates 3-A through 3-G and 3-12.

Oscillator 18 is connected to NOR gates 1-12, 2-12 and 3-12 by lines 178, 180 and 182, respectively. Oscillator 18 is connected to decoder/driver 22 by line 184. Scan capacitor 186 is connected to counter 56 by terminals 188 and 190. A source of positive voltage +$VDD$ is connected to terminals 192 of decoder/driver 22 and 194 of counter 56. A source of clock pulses is connected to terminal 196 of counter 56.

The operation of the system shown in FIG. 3 should be apparent from the previous description of operation of the system shown in FIG. 2a. Operation of the system of FIG. 3 will therefore not be explained in detail. FIG. 2a describes a system using switches for interrupting the liquid crystal display lines. In FIG. 3a, two input NOR gates are placed in series with the segments and back plane lines. Digits not to be selected have a logic ONE applied to one input of their NOR gates forcing the outputs low (ZERO). Thus no voltage is applied across the display. A selected digit has a ZERO logic level applied to its NOR gate. The decoder outputs now control which segments are energized.

Figure 4:
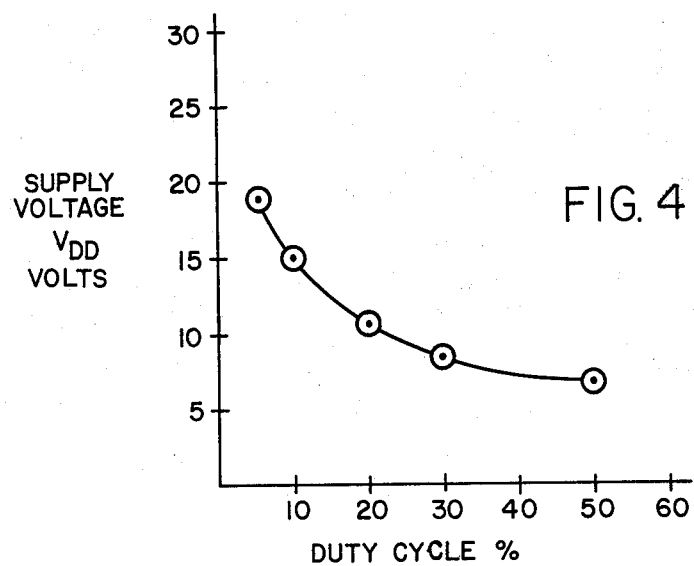
FIG. 4 is a graph showing supply voltage required with the circuitry and system of FIG. 3.

FIG. 4 is a graph of the voltage supply level, +$VDD$, required for driving the system of FIG. 3 as a function of the duty cycle. With a three digit liquid crystal display, the duty cycle is 33 ⅓ percent, with a four digit liquid crystal display, the duty cycle would be 25 percent, with a 10 digit liquid crystal display the duty cycle would be 10 percent, and so forth. When the accessing circuitry is implemented in complementary metal-oxide-semiconductor (CMOS) technology, a +$VDD$ of 15 volts can be supplied, which will allow in excess of 10 digits of a liquid crystal display to be multiplexed, as shown by FIG. 4.

In a specific example, a system in accordance with FIG. 3 may be fabricated using commercially available International Liquid XTAL Company Model 7041A-3.5 liquid displays, commercially available Motorola Part Number MC14001 NOR gates, MC14543 decoder drivers and MC14553 binary coded decimal counters. Capacitor 186 has a value of 0.01 microfarad in order to give a scanning frequency of 500 Hertz. To reduce the number of interconnections for a multi-digit liquid crystal display, the enabling gates, fabricated in complementary metal-oxide-silicon (CMOS) integrated circuit technology, for example, can be integrated directly on the liquid crystal display substrate. The number of interconnections would then be the seven segment lines plus a back plane line for each digit.

It should now be apparent that accessing circuitry and a system capable of achieving the stated objects of the invention have been provided. This system allows conventional multiplexing techniques to be used with liquid crystal displays without decreasing liquid crystal cell life time due to the presence of DC signals at the liquid crystal cells. The result is to eliminate duplication of major elements in the accessing circuitry that can be shared through multiplexing.

While the invention has been particularly shown and described in reference to the preferred embodiments thereof, it will be understood by those skilled in the art that changes in form and details may be made therein without departing from the spirit and scope of the invention. For example, dynamic scattering liquid crystal cells could be used in place of the twisted nematic field effect cells shown.

What is claimed is:

1. Accessing circuitry for a liquid crystal display with a plurality of digits, each digit having a plurality of segments and a back plane which comprises:
   a. a source of information to be supplied to the display,
   b. a plurality of enabling gates, one for each segment and one for the back plane for each digit of the liquid crystal display,
   c. a decoder/driver connected between the source of information and the enabling gates for the segments of the liquid crystal display, and
   d. means for supplying drive signals and control pulses to the enabling gates, whereby signals equal but opposite in polarity are applied to selected ones of the segments and their back planes and signals of the same polarity and magnitude are supplied to unselected segments and their back planes.

2. The accessing circuitry of claim 1 wherein said enabling gates are NOR gates, one input of said NOR gates having their outputs connected to the segments of said liquid crystal display being connected to the output of said decoder/driver circuit, the other input of said NOR gates connected to the segments of said liquid crystal display being connected to a digit select control signal source, one of the inputs of said NOR gates having their outputs connected to the back plane of said liquid crystal display also being connected to the digit select control signal source, the other input of said NOR gates having their outputs connected to the back plane of said liquid crystal display being connected to an excitation frequency which is also connected to said decoder/driver circuit.

3. A liquid crystal system, which comprises:
   a. the accessing circuitry of claim 2, and
   b. a liquid crystal display including a plurality of digits, each digit having a back plane and a plurality of segments separated from the back plane by liquid crystal material.

4. The system of claim 3 in which said liquid crystal display is a plurality of twisted nematic field effect liquid crystal cells.

5. The system of claim 3 in which said NOR gates are in integrated circuit form and are packaged on a common substrate with said liquid crystal display.

6. A liquid crystal system, which comprises:
   a. the accessing circuitry of claim 1, and
   b. a liquid crystal display including a plurality of digits, each digit having a back plane and a plurality of segments separated from the back plane by liquid crystal material.

7. In accessing circuitry for a liquid crystal display with a plurality of digits, each digit having a plurality of segments and a back plane, said circuitry including means for supplying drive signals to the segments and back plane of each digit, the improvement comprising:
   a plurality of enabling gates, one for each segment and one for the back plane for each digit of the liquid crystal display, and means for supplying drive signals and control pulses to the enabling gates, whereby drive signals equal but opposite in polarity are applied to selected ones of the segments and their back planes and drive signals of the same polarity and magnitude are supplied to unselected segments and their back planes.

8. A liquid crystal system, which comprises:

a. the accessing circuitry of claim 7, and b. a liquid crystal display including a plurality of digits, each digit having a back plane and a plurality of segments separated from the back plane by liquid crystal material.

9. The system of claim 8 in which said liquid crystal display is a plurality of twisted nematic field effect liquid crystal cells.

* * * * *